United States Patent [19]
Polstra et al.

[11] Patent Number: 5,136,590
[45] Date of Patent: Aug. 4, 1992

[54] KERNEL TESTING INTERFACE AND METHOD FOR AUTOMATING DIAGNOSTICS OF MICROPROCESSOR-BASED SYSTEMS

[75] Inventors: John D. Polstra, Seattle; Marshall H. Scott; Bruce T. White, both of Woodinville, all of Wash.

[73] Assignee: John Fluke Mfg. Co., Inc., Everett, Wash.

[21] Appl. No.: 441,093

[22] Filed: Nov. 24, 1989

Related U.S. Application Data

[63] Continuation-in-part of Ser. No. 275,495, Nov. 23, 1988, abandoned.

[51] Int. Cl.$^5$ ............... G06F 11/00; G01R 31/28
[52] U.S. Cl. ................... 371/16.2; 371/16.1; 395/575
[58] Field of Search ............... 371/16.1, 16.2; 364/200

[56] References Cited

U.S. PATENT DOCUMENTS

| | | | |
|---|---|---|---|
| 4,055,801 | 6/1970 | Pike | 371/25.1 |
| 4,108,358 | 3/1977 | Niemaszyk | 371/25.1 |
| 4,139,818 | 2/1979 | Schneider | 324/73 |
| 4,192,451 | 3/1980 | Swerling et al. | 371/16.2 |
| 4,402,055 | 8/1983 | Lloyd | 371/15.1 |
| 4,550,406 | 10/1985 | Neal | 371/22.6 |
| 4,567,592 | 1/1986 | Minicilli | 371/16.2 |
| 4,607,366 | 8/1986 | Stadlmeier et al. | 371/16.2 |
| 4,622,647 | 11/1986 | Sagnard et al. | 371/16.2 |
| 4,641,207 | 3/1987 | Green et al. | 371/16.2 |
| 4,641,348 | 2/1987 | Neuder | 382/1 |
| 4,654,583 | 3/1987 | Ninomiya et al. | 371/24 |
| 4,656,632 | 4/1987 | Jackson | 371/27 |
| 4,687,988 | 8/1987 | Eichelbarger | 371/22.3 |
| 4,691,316 | 9/1987 | Phillips | 371/16.2 |
| 4,785,416 | 11/1988 | Stringer | 371/16.2 |
| 4,788,683 | 11/1988 | Hester et al. | 371/16.2 |
| 4,789,924 | 12/1988 | Fukuta | 371/16.2 |
| 4,888,715 | 12/1989 | Tada et al. | 371/25.1 |
| 4,993,027 | 2/1991 | McGraw et al. | 371/16.2 |

FOREIGN PATENT DOCUMENTS 0191632 8/1986 France.

OTHER PUBLICATIONS

Hudson, Techniques For Developing and Testing Microprocessor Systems, Software and Microsystems, vol. 4, No. 4, Aug. 1985, pp. 85-94.

*Primary Examiner*—Charles E. Atkinson
*Attorney, Agent, or Firm*—Stephen A. Becker

[57] ABSTRACT

An improved testing apparatus and method for testing the kernel of a microprocessor based unit under test (UUT) in which connection to the UUT is made at both the memory connection socket and at the microprocessor with the microprocessor being in place and active in the UUT. The apparatus and method permits substantially full diagnostics of the kernel to be carried out in a systematic and automated manner in which the requirement of manual probing of the UUT is minimized. Connections at the microprocessor permit the development of high resolution sync signals for verification and evaluation of test results. The testing protocol implemented in the method includes the use of testing primitives which permit the development of a signature for each address and data bus line for the identification of the type as well as the location of any faults discovered by the apparatus. The method of testing exploits bootstrapping techniques including three primitives for bus test, data stimulus and address stimulus to optimize simultaneous testing and circuit fault diagnosis.

25 Claims, 11 Drawing Sheets

KERNEL TESTING INTERFACE AND METHOD FOR AUTOMATING DIAGNOSTICS OF MICROPROCESSOR-BASED SYSTEMS

This is a continuation-in-part of U.S. patent application Ser. No. 07/275,495, filed Nov. 23, 1988, now abandoned.

CROSS-REFERENCE TO RELATED APPLICATIONS

This application is related to patent application Ser. No. 275,184, entitled HARDWARE ENHANCEMENTS FOR IMPROVED PERFORMANCE OF MEMORY EMULATION METHOD by T. Locke, Ser. No. 275,183, now U.S. Pat. No. 4,989,207 issued Jan. 29, 1991, entitled AUTOMATIC VERIFICATION OF KERNEL CIRCUITRY BASED ON ANALYSIS OF MEMORY ACCESSES by J. Polstra, and Ser. No. 275,185, now U.S. Pat. No. 4,958,347 issued Sep. 18, 1990, entitled APPARATUS, METHOD AND DATA STRUCTURE FOR VALIDATION OF KERNEL DATA BUS by B. White, J. Polstra and C. Johnson, all assigned to the assignee of the present invention.

1. Technical Field

The present invention relates generally to the testing and troubleshooting of microprocessor-based electronic systems and more particularly to testing and troubleshooting of the kernel of microprocessor-based electronic systems using memory emulation techniques.

2. Background of the Invention

With the wide use of complex microprocessor-based systems in both consumer and industrial products, automation of testing and diagnosis of circuit faults, particularly of the kernel of such systems, has become extremely desireable. The kernel of such a system is well-understood in the art to refer to the microprocessor (uP), itself, and the associated elements, specifically the memory, clock, address bus and data bus, with which it is necessary for the microprocessor to correctly interact in order to function properly. So-called emulative testers in which an element of the kernel is emulated by the testing apparatus have become popular for functional testing because they enable detailed diagnostics of the kernel even where the kernel is not even minimally operative.

One type of emulative tester is a microprocessor emulator, exemplified by the tester described in U.S. Pat. No. 4,455,654, issued to K. S. Bhaskar et al, commonly assigned, and hereby incorporated by reference herein. In that system, connection is made to the UUT by removing the UUT microprocessor and connecting the test system through the microprocessor socket of the UUT. The Bhaskar system operates in a bus-access mode wherein single cycles of bus accesses are made and acted upon before proceeding with another cycle. A bus access cycle places the test system microprocessor into communication with the UUT bus to perform a read or write operation and then switches the test system microprocessor over to the internal circuitry of the test system to generate another read or write command with a new address or to take appropriate action on data read from the memory of the UUT. In such systems, the bus switching required to effect single access cycles is becoming a limitation when applied to faster and more complex microprocessors and the design of suitable bus switches is not trivial.

Another type of emulative tester is a ROM (or, more generally, memory) emulator wherein the system ROM is replaced by a emulation memory programmed to contain system test instructions and data. ROM emulation is deemed desireable since the ROM is in direct communication with the UUT data and address buses and the pin configurations of ROM sockets are relatively simple. ROM emulators are well known for use in software design and operational verification of the microprocessor but have only recently been used for fault detection and diagnosis because no sync signal is typically available to synchronize the test equipment with the test results it receives. A solution to this problem is disclosed in U.S. patent application Ser. No. 07/158,223, now U.S. Pat. No. 4,868,822 issued Sep. 19, 1989, of M. H. Scott et al, filed Feb. 19, 1988, for MEMORY EMULATION METHOD SYSTEM FOR TESTING AND TROUBLESHOOTING MICROPROCESSOR-BASED ELECTRONIC SYSTEMS, assigned to the common assignee and hereby fully incorporated by reference herein. That test system comprises a microprocessor-based mainframe and an interface pod which also includes a microprocessor-based system which is connected to both the microprocessor and the memory socket of the UUT. The interface pod includes special logic circuitry connected to the UUT microprocessor to provide a fine resolution sync signal pulse during a bus cycle of interest in order to provide full troubleshooting fault isolation that is as effective as that provided by prior art microprocessor emulation. This is because the high resolution sync pulse derived from the microprocessor can be used to isolate and evaluate signals monitored from the address and data buses at the memory socket with the same facility as they could be from microprocessor connections. The interface pod gains control of the microprocessor, which then executes instructions provided by the emulation memory connected to the UUT memory space. An analyzer RAM monitors the UUT memory connections for each bus cycle which is encoded using the UUT memory chip select line.

Also, as disclosed in that application, ROM emulation may be generalized to memory emulation (e.g. the emulation of any memory or portion of memory) since the trend in microprocessor-based systems is to increase RAM while reducing ROM and possibly eliminating ROM altogether.

Although the details of the system described in the copending application are provided in detail therein and are, for brevity, not repeated here, an overview of that system is shown in FIGS. 1–3.

FIGS. 1 and 2 show the overall test system which includes a mainframe unit 10 of small size including a probe 32 and a keyboard 20 and display 22. Memory interface pod 12 is connected to the mainframe by a multi-conductor cable in a manner well known in the art. The pod preferably contains a personality module 3 which serves to configure the test apparatus for the type of processor used in the UUT. Multi-conductor cables also connect the pod to memory module 100 and sync module 150 which function principally as bidirectional repeaters to ensure reliable communication over the cables and also perform some logic and switching functions. The memory module may also provide a connection for the UUT memory so that when memory emulation testing is completed, the UUT may be operationally tested with its own memory 70 electrically in place. It will be understood that the physical configuration of the mainframe, pod and modules, while deemed preferable from the standpoint of operator convenience, is not essential to the invention and could, for example, be included within a common housing or be regrouped and distributed in a larger or smaller number of housings than illustrated.

The following is a brief overview of the operation of the system of the copending application with particular reference to FIG. 3 which is a more detailed schematic diagram of the system shown in FIG. 2. An operator initiates a particular test of interest using the keyboard 20 and display 22, and control measurement circuits 24 generate instructions and commands which are passed through I/O 28, cable 50, and pod I/O 46 to the pod kernel. The pod microprocessor 40 sets up the circuitry within the interface pod 12 to perform the desired test. Diagnostic instructions are placed in the emulation RAM 64, and reset control is passed through the I/O port 46 and over cable 90 to gain control of microprocessor 70, which resets and then begins executing the instructions in emulation RAM 64. Analyzer RAM 62 monitors test results coming back over cable 92 and passes these results to the pod kernel which in turn transmits information back to the mainframe 10 via cable 50. If faults are detected, the operator may be prompted to place probe 32 on particular node within the UUT 14, and the sync pulse extracted from the UUT microprocessor 70 ensures that information read by the probe occurs at the appropriate time, i.e., within a bus cycle of interest.

One important aspect of the system of FIGS. 1-3 is the use of the chip select line 82 to retrieve useful information from a Read operation performed on a UUT ROM at memory space 72. In this test method, UUT microprocessor 70 is reset, and begins executing instructions presented to memory space 72 by emulation RAM 64. As the UUT microprocessor 70 executes a number of bus cycles, UUT address decoder 80 decodes the chip selection as a series of ones and zeros. The analyzer RAM 62 monitors the chip select pin at the memory 72 socket, and indicates faults if a chip select signal during a particular bus cycle is not the logic level expected. In this manner, test results can be passed back to the interface pod from a ROM socket.

FIG. 4 shows in closer detail the interconnection between emulation RAM 64 and UUT memory 72. In particular, because the cable 92 may be quite long, a memory module 100 may be provided to condition the signals to ensure proper operation. Of course, if cable 92 is very short, then the memory module 100 is not needed.

Included in the memory module 100 are buffers 102 and 104 interposed in the signal paths. The end of cable 92 includes a connector 110 for connecting directly into a UUT memory socket, and the ROM module 100 may include a socket 112 to receive the UUT memory. In such a configuration, an operator can select between instructions from the interface pod 12, that is, from emulation RAM 64, or from the UUT memory in socket 112. Accordingly, a switch 114 may be provided to enable either the data buffer 102 or the memory socket 112 while disabling the other. In situations where the UUT memory being emulated is the boot ROM, depending upon the width of the UUT bus, there may be several UUT boot ROMs, requiring several connectors 110 and several memory modules 100. As a practical matter, the present invention provides sufficient flexibility to accommodate almost any UUT memory configuration.

One important feature of this test apparatus is to provide two banks of emulation RAM represented by emulation RAM banks 64A ad 64B. To ensure that the UUT remains alive during functional testing, one bank of emulation RAM is always presented to the UUT microprocessor 70 during the test. Therefore, the interface pod kernel can be loading microprocessor instructions into one of the banks while the other is switched over to the UUT memory space and the UUT microprocessor 70 is executing instructions from that other bank. At the appropriate time, the banks can be switched in such a manner that UUT microprocessor 70 is unaware that the instructions being executed are coming from another emulation RAM. The emulation bank select signals are produced by logic circuit 70, and will be discussed in connection with FIG. 5.

Data from the emulation RAM banks 64A and 64B pass over a data bus and through buffer 102 to the memory socket. Information from the UUT memory socket in the form of UUT memory inputs is fed back over a bus 122 and through buffer 104 in the memory module 100 to the interface pod 112, and as will be seen later, these UUT memory inputs will be used by the analyzer RAM 62 and by the logic circuit 60. Referring again to FIG. 2, a ROM type-selection logic circuit 126 is connected to the UUT memory inputs bus, which, if UUT memory 72 is a ROM, generates a signal to ensure proper pin information being matched with the interface pod 12. That is, while the physical JEDEC pin configurations may be the same from ROM to ROM, the electrical connections may be different (in other locations) from ROM to ROM. The pod kernel tells the logic circuit 126 what type of ROM is to be emulated.

While the system of the copending application enables full diagnostics and provides a high degree of automatic testing, the operator is often required to probe the UUT to realize the full diagnostic capability of that system. This required probing is time consuming and requires a higher degree of skill of the operator of the testing apparatus. That arrangement and test procedure also does not adequately allow for marginal levels of operability of the UUT microprocessor and does not fully exploit the diagnostic benefits that can be derived from "bootstrapping", wherein testing is begun with the simplest functions and proceeds through a sufficient number of increasingly complex functions until full functional integrity of all circuits can be deduced or faults fully diagnosed.

DISCLOSURE OF THE INVENTION

It is, therefore, an object of this invention to provide a method and apparatus for verifying limited operability of the microprocessor in the kernel of a microprocessor-based unit under test.

It is another object of the invention to provide a method and apparatus for detecting whether there is an error in the performance of a load instruction upon reset of the microprocessor in the kernel of a unit under test.

It is a further object of the invention to provide a method and apparatus for placing a predetermined sequence of data patterns on the data bus of the kernel of a unit under test and analyzing the sequence of response patterns to determine defects in the data bus.

It is yet another object of the invention to provide a method and apparatus for placing a sequence of data patterns on the data bus of the kernel of a unit under test and analyzing the response patterns to distinguish between address bus and data bus defects.

It is a yet further object of the present invention to provide a method and apparatus for developing a high resolution synchronization pulse in an adaptive manner to enhance data capture by an analyzer memory.

Therefore, in accordance with one aspect of the invention, a method and apparatus is provided for placing an executable program including data and a plurality of load instructions into an emulation memory at locations corresponding to a boot portion thereof, resetting the microprocessor to execute the program and detecting addresses and instructions on the address bus of the kernel of a unit under test.

In accordance with another aspect of the invention, a method and apparatus is provided for placing at least one load instruction into an emulation memory, executing the load instruction to place a predetermined bit pattern on a portion of the address bus, detecting a bit pattern on the address bus and evaluating the bit pattern on the address bus to detect an error in the performance of the load instruction.

In accordance with a further aspect of the invention, a method and apparatus is provided for sequentially loading a plurality of bit patterns into a location of an emulation memory, detecting a bit pattern on a portion of the data bus of the kernel of a unit under test in response to a synchronization signal derived from the reset of the microprocessor and analyzing the sequence of bit patterns to detect defects in the data bus.

In accordance with yet another aspect of the invention, a method and apparatus is provided for placing a load instruction with a predetermined bit pattern as immediate data into the reset address of an emulation memory, executing the load instruction, detecting a resulting bit pattern on the data bus, placing a program including the complement of the predetermined bit pattern as immediate data in the emulation memory, executing the program, detecting a further resulting bit pattern on the address bus and analyzing each of the resulting bit patterns to isolate faults between the address bus and the data bus. In accordance with a yet further aspect of the invention, a method and apparatus is provided for analyzing, in order, the voltage levels on the power supply pins, clock pins, forcing pins and status pins of a microprocessor in accordance with a synchronization pulse generated in response to a reset command of the microprocessor.

In accordance with another further aspect of the invention an apparatus and method is provided for placing a predetermined bit pattern as immediate data at the boot location of an emulation memory, monitoring the address bus for addresses appearing thereon, counting the number of addresses between the appearance of the boot location and the predetermined bit pattern for empirically developing a synchronization signal.

The present invention is directed to a test procedure for use in testing apparatus for testing microprocessor-based systems and devices. More particularly, the present invention is a hardware implemented procedure exploiting bootstrapping, and moreover, using the simplest available structure and minimum number of signals for error detection. The test procedure of this invention, when implemented in a system similar to the memory emulation system of the copending Scott et al application, also provides kernel diagnosis capability at low operational levels of the microprocessor and inoperative kernels.

This invention includes method for testing the kernel of a microprocessor-based unit under test (UUT) having a microprocessor, memory and data and address buses comprising the steps of placing at least one load instruction into an emulation memory electrically substituted for the memory of said UUT, initiating reset of the UUT, executing the load instruction to place a predetermined bit pattern on a portion of the address bus, detecting a bit pattern on a portion of the address bus and evaluating the bit pattern on the address bus to detect an error in the performance of the load instruction.

The invention includes a bus test primitive includes the characteristic steps of placing at least one load instruction into an emulation memory electrically substituted (e.g. physically replaced or connected in parallel with power disconnected from the UUT memory) for the memory of a UUT, initiating reset of the UUT, executing the load instruction to place a predetermined bit pattern on a portion of the address bus, detecting a bit pattern on a portion of the address bus and evaluating the bit pattern on the address bus to detect an error in the performance of the load instruction.

The invention further includes a data stimulus primitive includes the characteristic steps of loading one of a sequence of bit patterns into a location of an emulation memory which has been electrically substituted for the UUT memory, initiating reset of the UUT, generating a sync signal responsive to the reset of the, detecting a bit pattern on the data bus and/or a bit on the chip select line in accordance with the sync pulse and analyzing the pattern of signals on ones of the data bus lines and/or the chip select line caused by the sequence of bit patterns upon repeated reset of the to verify or diagnose the functionality of lines of the data bus.

The invention includes the further feature of an address stimulus primitive that is characterized by the steps of loading a small program or selected bit pattern into an emulation memory which has been electrically substituted for the memory of a UUT, resetting the microprocessor to cause execution of the program, detecting a bit pattern on the address bus and evaluating the bit pattern on the address bus relative to the selected bit pattern to diagnose faults in the respective lines of the data bus.

This invention, as implemented in a memory emulation testing apparatus, particularly of the type disclosed in the copending Scott et al application, includes a plurality of novel procedures including a bus test primitive, a data stimulus primitive and an address stimulus primitive, which will be individually summarized below. Each of these primitives has utility for testing a particular portion of the kernel of a microprocessor-based system and when utilized in a sequence according to the invention permit a higher degree of automated testing and diagnostics at high speed and increased operator convenience.

The present invention includes a method and apparatus for using a Memory Device Emulator (MDE) pod to determine the functionality of a microprocessor kernel in a Unit Under Test (UUT), as well as a method for finding and diagnosing any kernel faults that are found. First the UUT kernel is tested for functionality. If the UUT kernel is found to be non-functional, then a diagnostic procedure is followed to identify and diagnose the specific fault. The detailed description of the methods and apparatus used in performing this test and diagnosis according to the invention is provided below.

An analyzer RAM 62 is disclosed in the above incorporated M. H. Scott et al application, Ser. No. 07/158,233, now U.S. Pat. No. 4,868,822 issued Sep. 19, 1989, an analyzer RAM (ARAM) is a memory device which is connected to the low-order twelve or thirteen address lines at the unit under test ROM socket. It is capable of capturing the levels of the address lines for up to 2,048 consecutive unit under test Boss cycles. This allows the pod to gather the trace of the unit under test activity which can then be analyzed by the firmware. It is an important aspect of the present invention to use the ARAM to develop cyclic redundancy check (CRC) signatures for the address and data buses during the execution of the primitives according to this invention. The ARAM facilitates both go-no go testing of the unit under test as well as diagnosis, including isolation of defects between the data bus and the address bus without the necessity of probing.

DETAILED DESCRIPTION OF THE INVENTION

Figure 1:
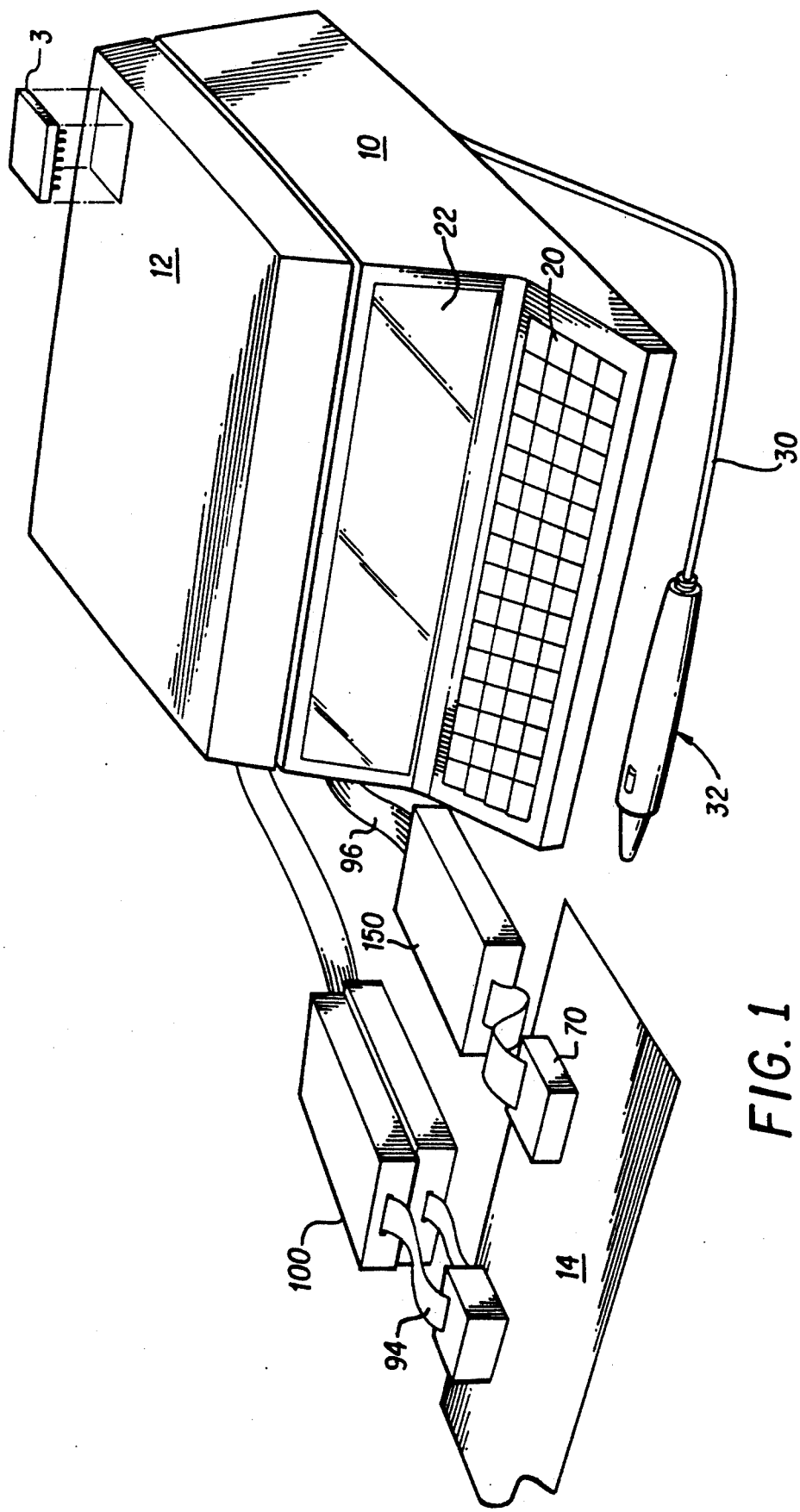
FIG. 1 is an illustration of the testing apparatus disclosed in the copending application of Scott et al, supra, to which this invention is applied.
Figure 2:
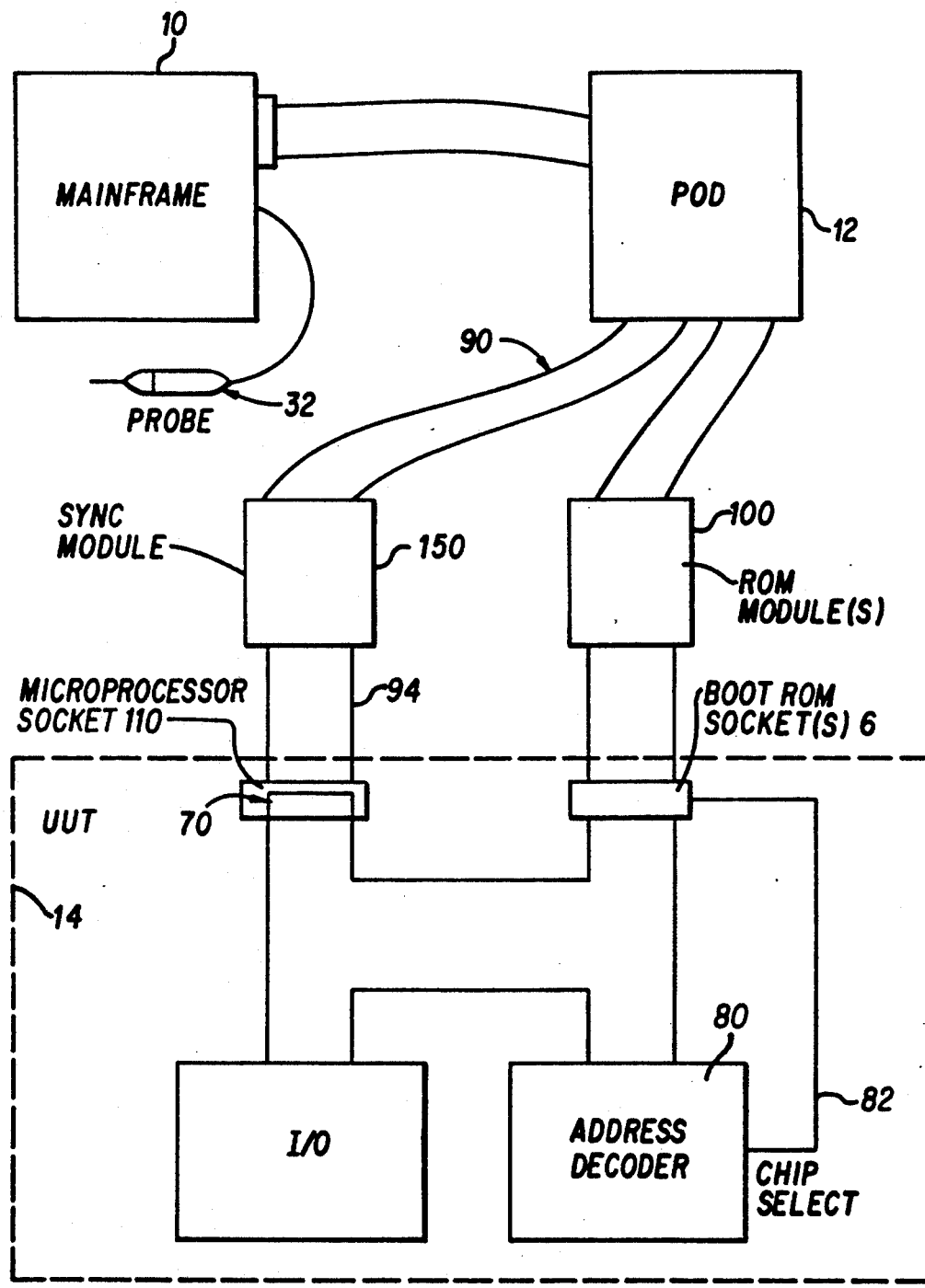
FIG. 2 is a simplified block diagram of the invention.
Figure 3:
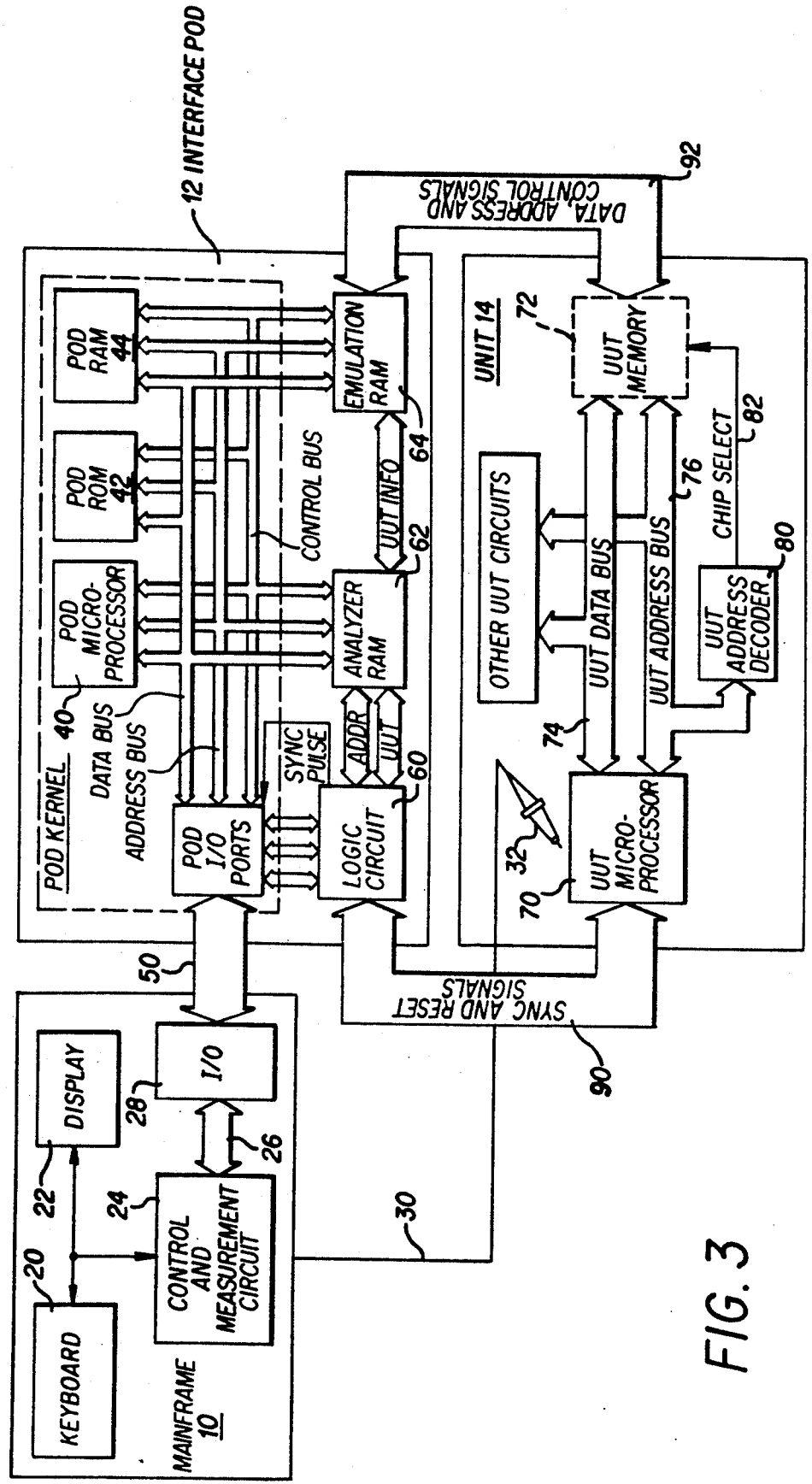
FIG. 3 is a detailed block diagram of the overall system as shown in FIG. 2.
Figure 4:
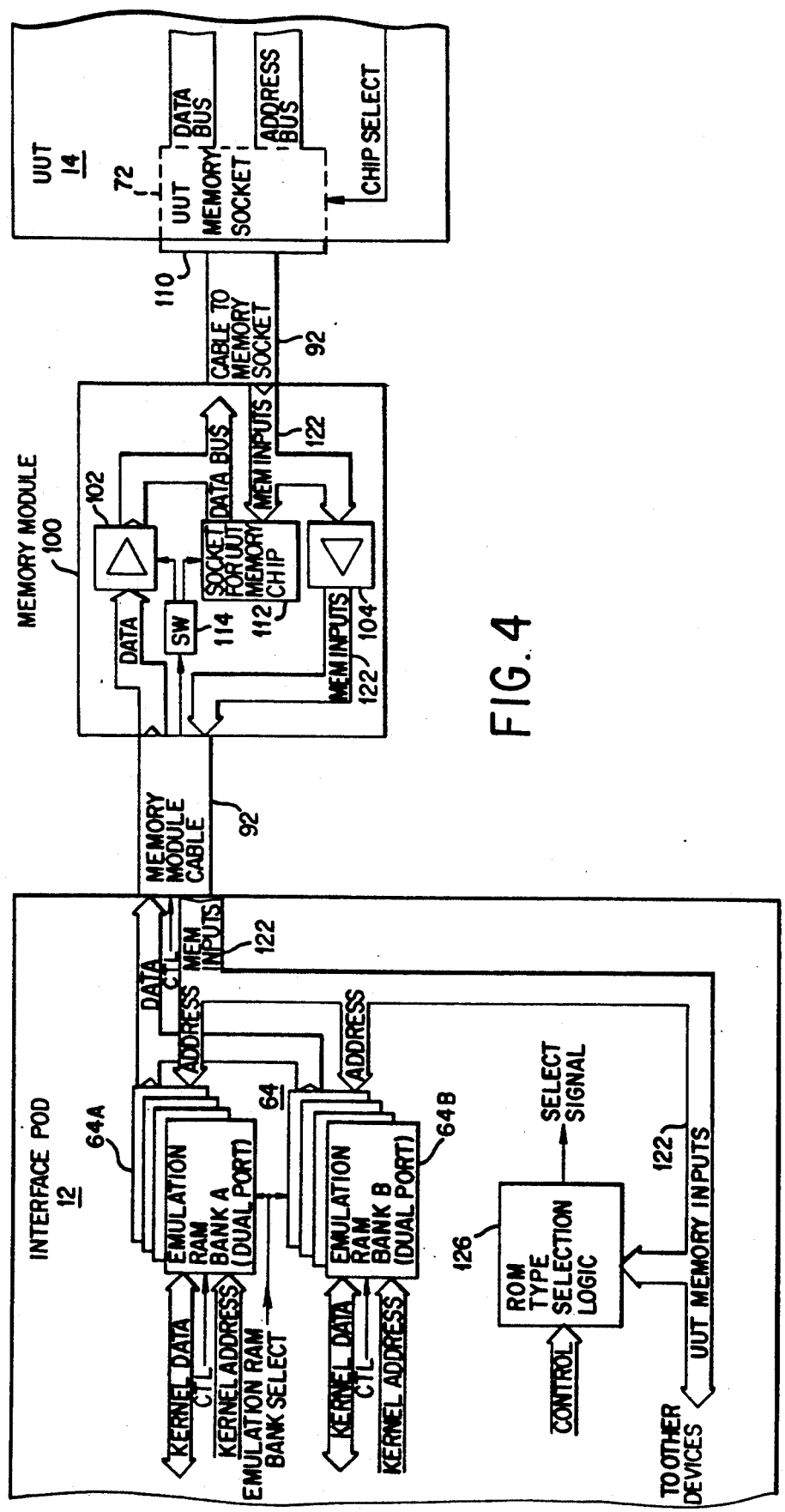
FIGS. 4 and 5 are a detailed illustration of the internal organization of the pod, memory module and sync module.
Figure 5:
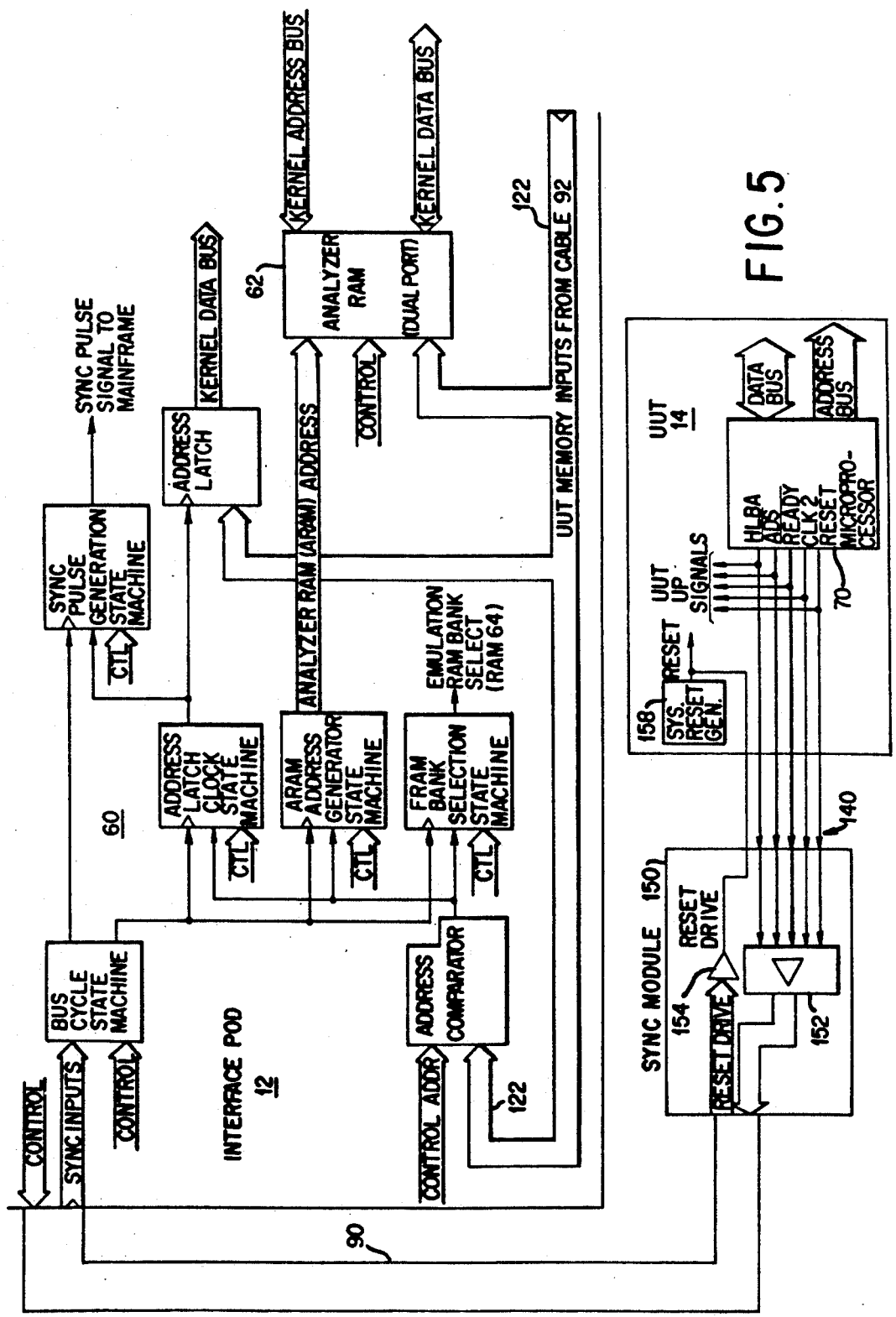
Figure 6:
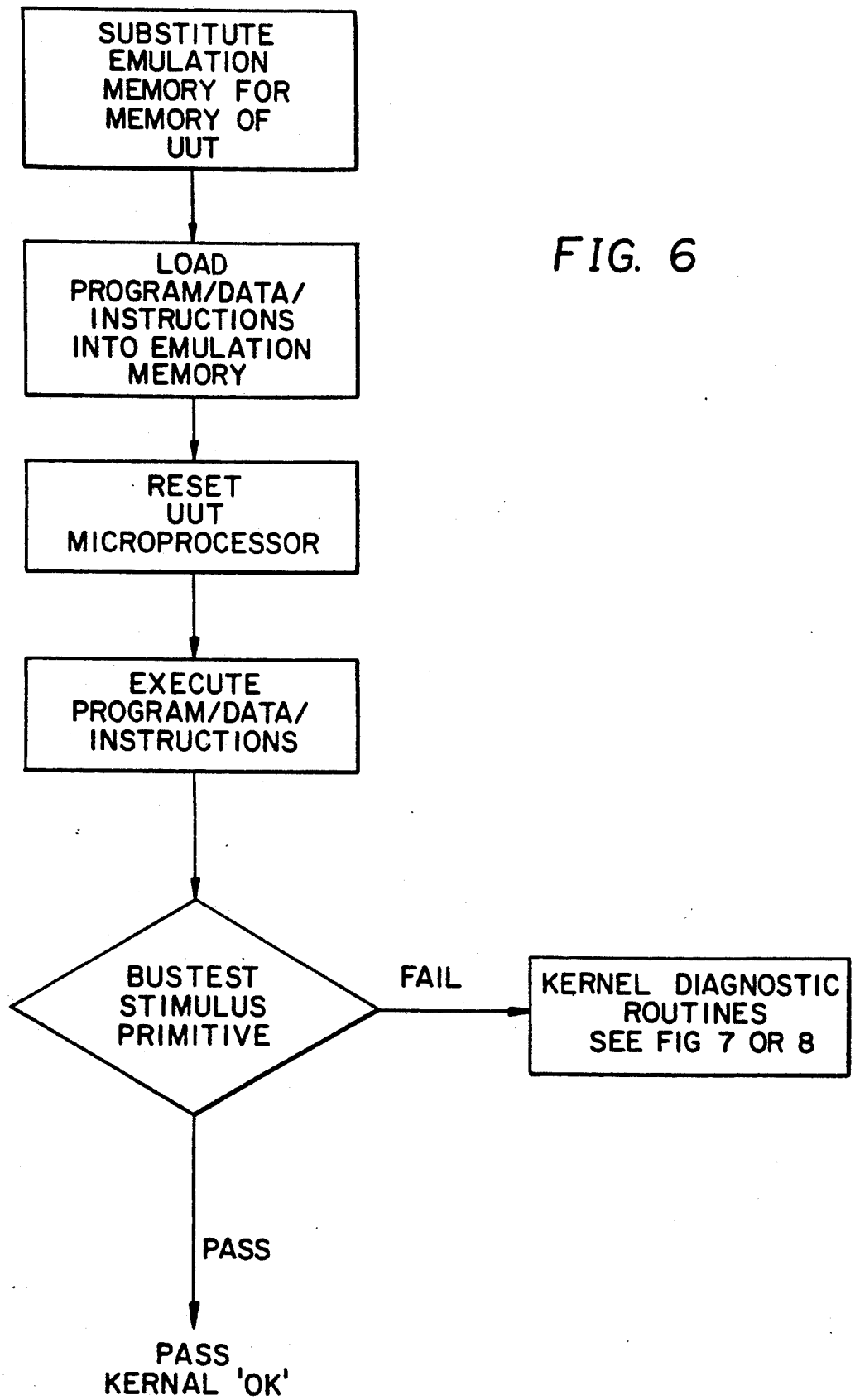
FIG. 6 is a block diagram of the basic test and diagnosis routine.

FIG. 6 shows a block diagram of the basic test program. The first step in the test procedure is to determine the functionality of the kernel. This uses the BUSTEST stimulus primitive, the detailed operation of which is described later in the document. The BUSTEST stimulus primitive returns pass or fail, reflecting the functionality of the microprocessor kernel. If the BUSTEST primitive passes, then the portion of the microprocessor kernel connected to the boot ROMs can be said to be fully functional. Once this functionality is verified, all of the pod's higher level tests, such as READ and WRITE, can be performed. Some of these higher level functions were defined in the U.S. patent application Ser. No. 07/158,223, of M. H. Scott et al, filed Feb. 19, 1988, now U.S. Pat. No. 4,868,822 issued Sep. 19, 1989 for "MEMORY EMULATION METHOD AND SYSTEM FOR TESTING AND TROUBLESHOOTING MICROPROCESSOR-BASED ELECTRONIC SYSTEMS". Once the BUSTEST primitive has reported that the kernel is functional, then no further testing or diagnosis is done, and the test routine will report to the user that the kernel is fully functional. If the BUSTEST primitive determines that the kernel is not functional, then the fault diagnosis routines begin.

Overview of Basic Kernel Diagnostic Routine

Figure 7:
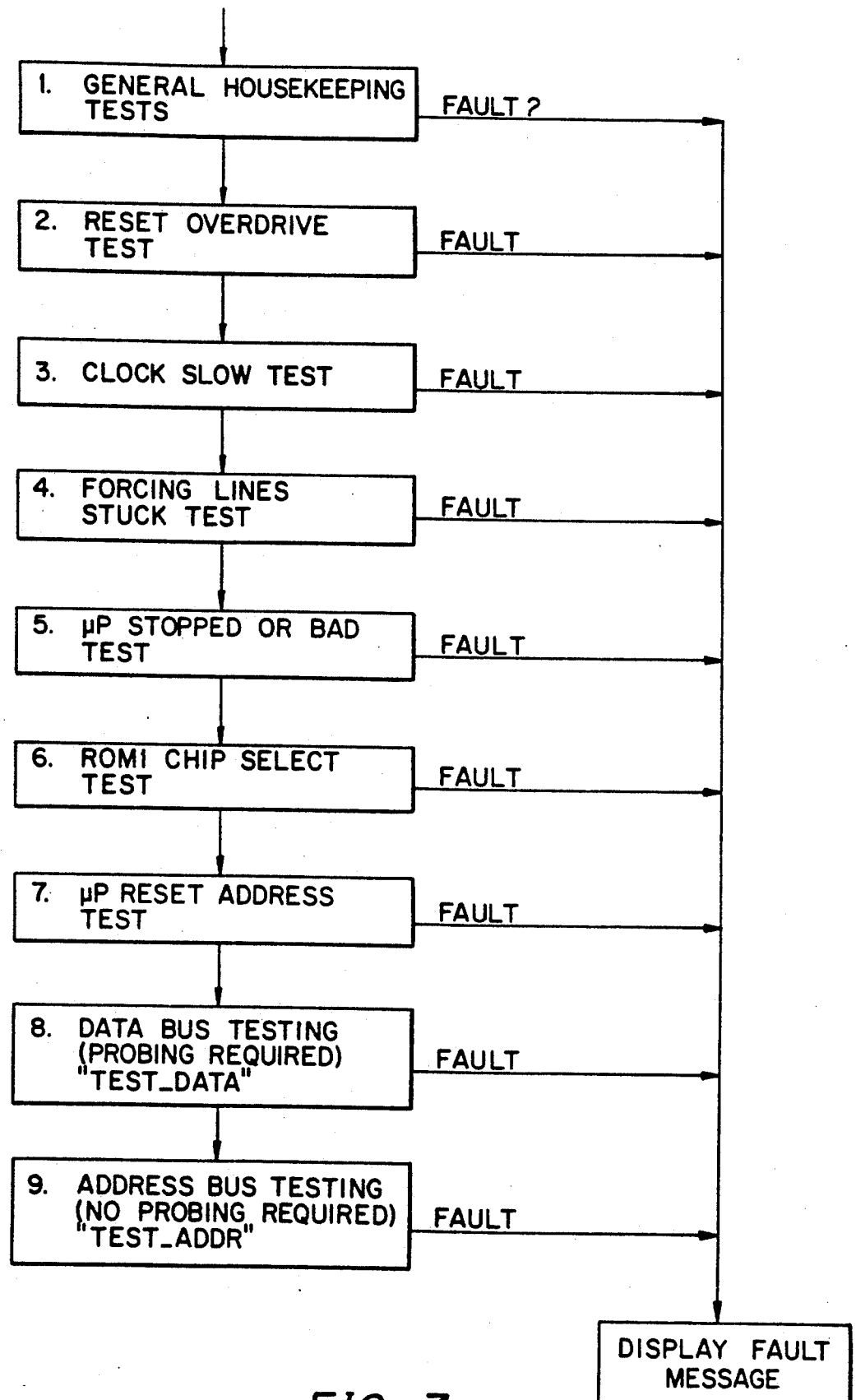
FIG. 7 is a block diagram of the basic kernel diagnostic routine.

The fault diagnosis routines use a bootstrapping technique, whereby the most basic kernel functions are tested first. Once these basic functions have been verified, more complicated kernel functions are tested, using the functionality that was previously verified. If at any point a failure is detected, it is communicated to the user. By testing in this bootstrap fashion, the most basic fault will always be uncovered and reported first. The basic kernel diagnostic routine is described in FIG. 7. The following paragraphs are numbered to match the blocks in FIG. 7. In all of the following steps, any fault discovered will cause a fault message to be displayed to the user, and will cause the diagnostic program to halt. Some of these steps include examples of signals that would be tested for a UUT based on the 80386 microprocessor. But, the general techniques are applicable to any type of microprocessor.

1. First, general housekeeping checks are performed on the UUT and pod. These include checking to see if the ROM modules are plugged in, UUT power is applied, and the like. A detailed discussion of the technique of testing and reporting faults discovered at this point is given in parent Ser. No. 275,494, noted above, which is hereby incorporated by reference.

2. Then the reset overdrive line is toggled, in order to generate a reset of the microprocessor. The reset line at the microprocessor is monitored by the pods sync module to ensure that this behavior occurs.

3. Next the UUT clock signal is checked to verify that it is operating in the proper frequency range.

4. Next the processor's forcing lines are checked, to see if they are stuck active. Forcing lines that are active will prevent the processor from operating. Some microprocessor inputs are considered to be forcing if they could disable microprocessor operation if stuck in the wrong state. For the 80386, READY, HOLD, and RESET are considered to be forcing lines.

5. Next, key processor control lines are monitored to ensure that the processor is not stopped. For the 80386, these lines include ADS, and HLDA. Since there is a clock, and no forcing lines are active, and the processor has just been reset, the microprocessor should be running.

6. Next, a boot ROM chip select should be detected. Since the processor's reset line was toggled, the processor should attempt to read from the reset address. The contents of the reset address will always be found in the boot ROM. This implies that the boot ROM should receive a chip select. This chip select, if present, would be detected by the pod hardware via the ROM module, plugged into the boot ROM socket of the UUT.

7. Simultaneously with the chip select above, the address generated by the processor is monitored to ensure that it is the correct reset address for that processor. This monitoring is also done via the ROM module, plugged into the boot ROM socket of the UUT.

To reiterate, if any of the above steps have detected a fault, a message describing the fault will be displayed to the user, and the diagnostic procedure would end. All of the tests described above can be done with no user interaction; e.g. no user probing is required to this point in the test. If no fault has been detected to this point, the microprocessor will be known to attempt to fetch the data contained in the boot ROM, at the reset address.

8. Now the data bus is tested. This testing is done by a subroutine called TEST_DATA, described in detail below. Basically, the data bus is tested by verifying that the data known to be present at the reset address is correctly passed over the data bus to the microprocessor. It should be noted that this test usually involves probing by the user. Because of this manual probing, this is the slowest portion of the diagnostic procedure. If any fault is detected, a fault message will be displayed to the user, and the diagnostic routine will end.

9. Lastly, the address bus is tested. The subroutine called TEST_ADDR, described in detail below, is used to perform this testing. Since no fault was detected on the data bus, the processor is able to successfully fetch opcodes from the boot ROM. These opcodes then command the processor to put a specified address on the address bus. By monitoring the address bus at the ROM modules, improper address operation can be determined. It should be noted that this test does not involve any probing or other user interaction, since all address lines of interest are monitored by the ROM module. It is important to note that this test can only be performed if the data bus is known to have no faults. Since this test must fetch both opcodes and an operand describing the address over the data bus in order to command the processor to fetch from the desired address, the data bus must be fully operational for this to work.

Overview of Enhanced Kernel Diagnostic Routine

While the basic diagnostic routine, described above, works well and has excellent fault coverage, it is not ideal operationally. Ideally, the user would like to perform the most time consuming step last. The data bus testing, paragraph 8 above, requires user interaction and is thus the slowest portion of the diagnostic procedure. For example, if a UUT had a fault on an address line, the user would have to completely test and diagnose the data bus by probing before lines on the address bus could be tested. A better implementation would do the address bus testing, paragraph 9 above, before the data bus testing. But performing the address bus testing requires that the data bus work properly. What is therefore needed is a routine that validates the data bus, with no user interaction.

Figure 8:
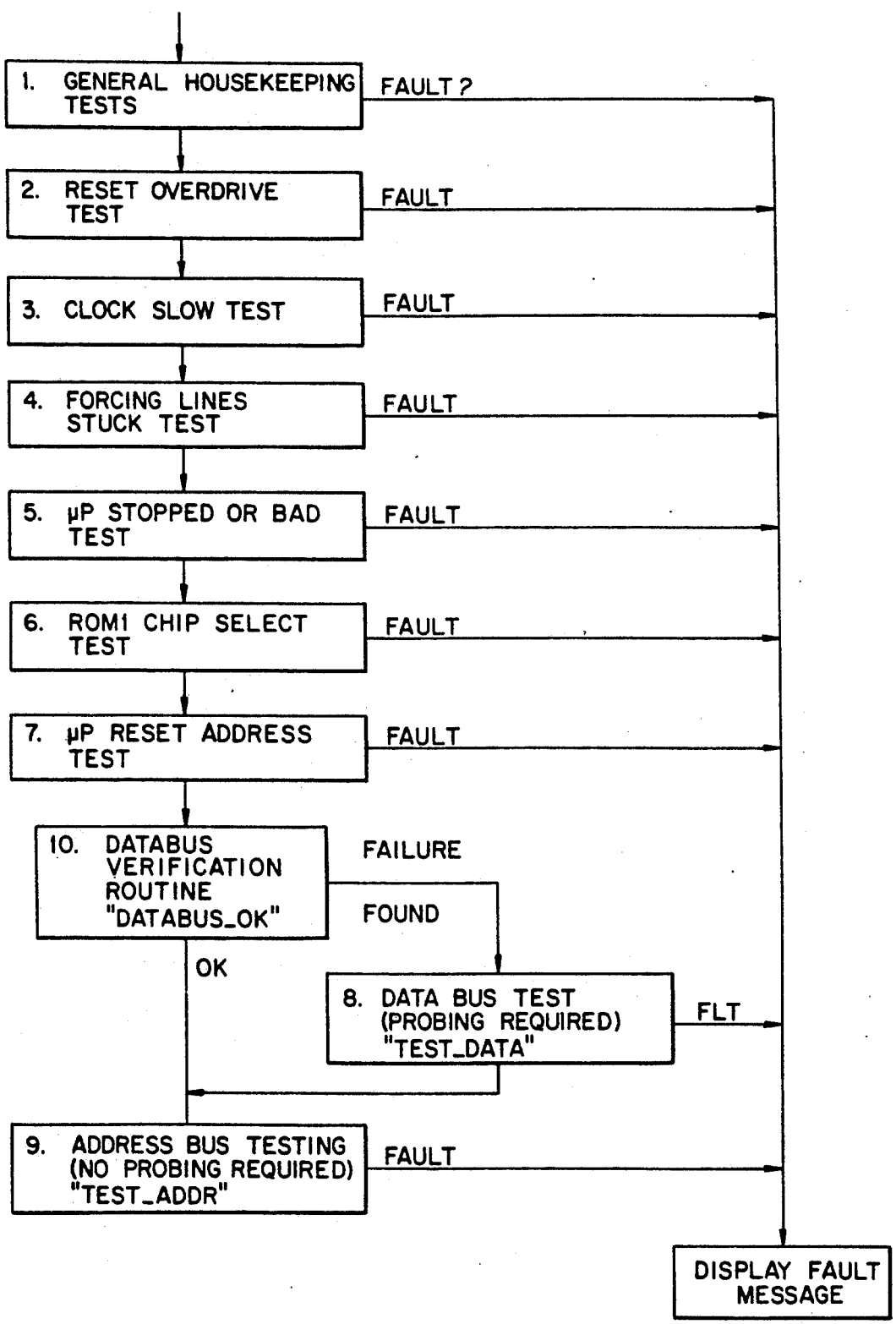
FIG. 8 is a block diagram of the enhanced kernel diagnostic routine.

FIG. 8 shows such an implementation, with block number 10 being the new data bus validation routine. This subroutine, called DATABUS_OK, is described in detail below. It should be noted that the first 7 steps of FIG. 8 are the same as in FIG. 7. If DATABUS_OK finds that there is a fault on the data bus, the data bus will be tested by the same routine used in paragraph 8 above. But if no fault is discovered, the address bus testing, the procedure of paragraph 9, will begin immediately. Now consider the same example as above, where there is an address line fault. Because there is no fault on the data bus, the DATABUS_OK routine will pass and the TEST_ADDR routine will be run, and will find the fault. Thus, the address bus fault will be discovered with no user interaction.

TESTING SUBROUTINES: TEST_DATA

Figure 9:
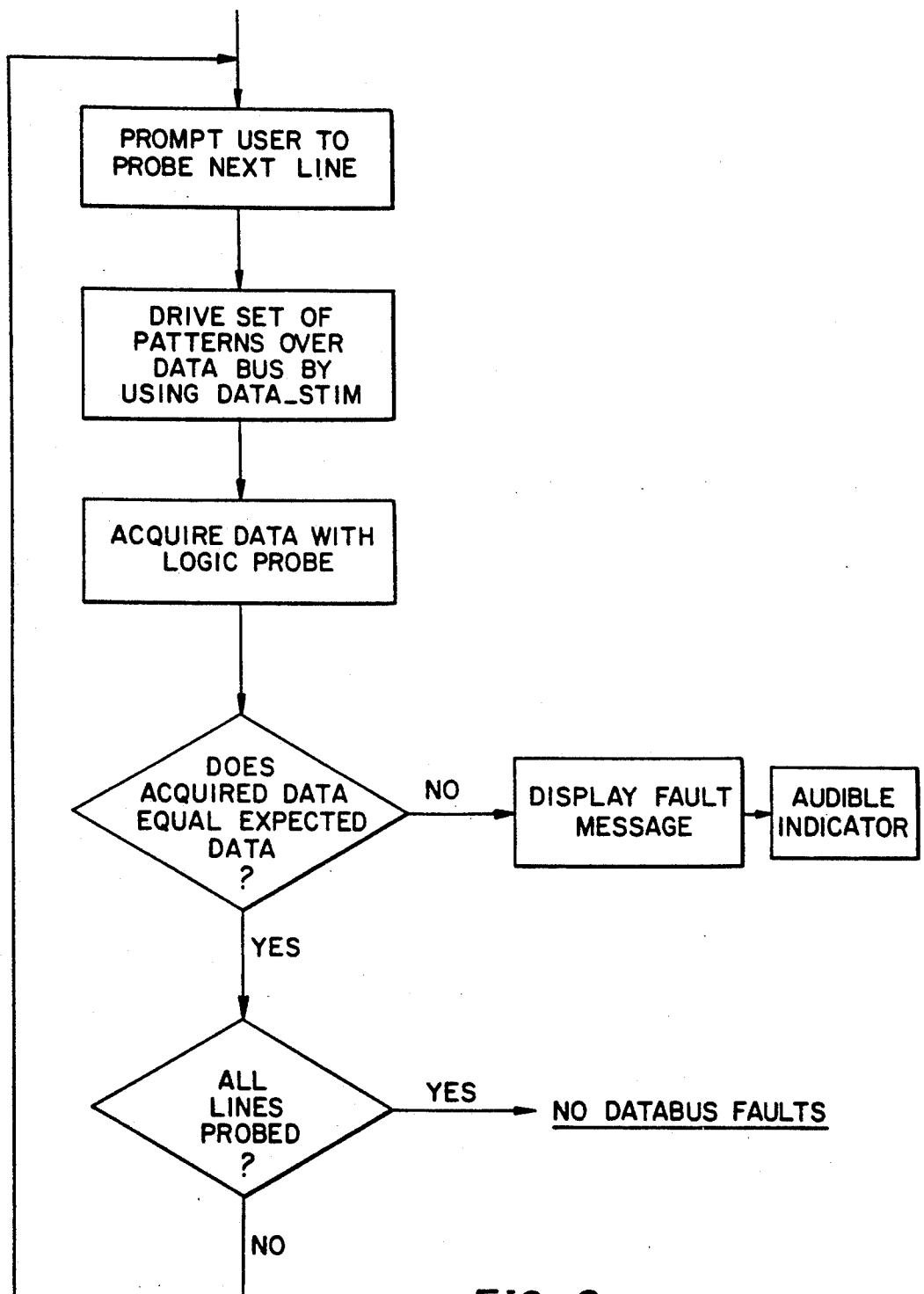
FIG. 9 is a block diagram of the TEST_DATA test subroutine.

This is a routine that is designed to test and diagnose all faults present on the data bus of a UUT. FIG. 9 shows a block diagram of the test routine. This routine uses a set of twelve 32 bit wide test patterns, described in Table 1. These patterns are expressed in 32 bit hexadecimal numbers, in which the least significant bit maps to the least significant bus line.

TABLE 1

| 32 BIT TEST PATTERNS | | |
|---|---|---|
| 1) FFFFFFFF | ! | all bits high |
| 2) FFFF0000 | ! | pattern of 16 bits high, 16 bits low |
| 3) FF00FF00 | ! | repeating pattern of 8 bits high, 8 bits low |
| 4) F0F0F0F0 | ! | repeating pattern of 4 bits high, 4 bits low |
| 5) CCCCCCCC | ! | repeating pattern of 2 bits high, 2 bits low |
| 6) AAAAAAAA | ! | repeating pattern of 1 bit high, 1 bit low |
| 7) 55555555 | ! | repeating pattern of 1 bit low, 1 bit high |
| 8) 33333333 | ! | repeating pattern of 2 bits low, 2 bits high |
| 9) 0F0F0F0F | ! | repeating pattern of 4 bits low, 4 bits high |
| 10) 00FF00FF | ! | repeating pattern of 8 bits low, 8 bits high |
| 11) 0000FFFF | ! | pattern of 16 bits low, 16 bits high |
| 12) 00000000 | ! | all bits low |

In the preferred embodiment, as shown in FIG. 9, the user is prompted to probe each data line. While he is probing a line, the patterns of Table 1 are fetched over the data bus by successive invocations of the DATA_STIM stimulus primitive. The DATA_STIM stimulus primitive is described in detail below. Each invocation of DATA_STIM causes a sync pulse to be generated at exactly the proper time when valid data is being fetched over the data bus. Generation of this sync pulse is described in the Scott et al application, incorporated by reference above. An enhanced, alternative technique of providing this sync pulse is described in the copending T. Locke application Ser. No. 275,184, which is also hereby incorporated by reference. This sync pulse is used to strobe the logic probe and cause it to measure the actual levels seen on that line of the data bus. In the preferred embodiment, this series of levels is converted to a cyclic redundancy check (CRC) signature. Next, the data acquired by the logic probe is compared to the expected data. (Again, in the preferred embodiment, the measured CRC signatures are compared against CRC signatures computed from the expected data, which are embedded in the test program.) If the measured data and the expected data are different for any particular line, then that data line has a fault on it, and a fault message accusing that particular data line can be displayed. If the acquired data is equal to the expected data, then there is no fault on that data line. If there are more data lines to probe, the process is repeated for each line. If there are no more lines to probe, then the test is said to have passed.

Note that although the procedure shown in FIG. 9 involves the user probing data lines, different methods can also be used. Other implementations could use a robot prober in place of the user, or additional hardware could be provided that monitor all of the data lines such that probing is not required. In any case the basic procedure remains the same: a predefined pattern is fetched from the ROM modules over the data bus, and each data line is measured to determine if the pattern was correctly received.

Although the patterns shown above in Table 1 are 32 bits wide, the technique described can be applied to a bus of any width. If the bus is less than 32 bits wide, the same patterns may be used, with the unused upper bits masked off. If the bus to be tested is greater than 32 bits wide, a longer and wider sequence of patterns would be used.

TEST_ADDR

Figure 10:
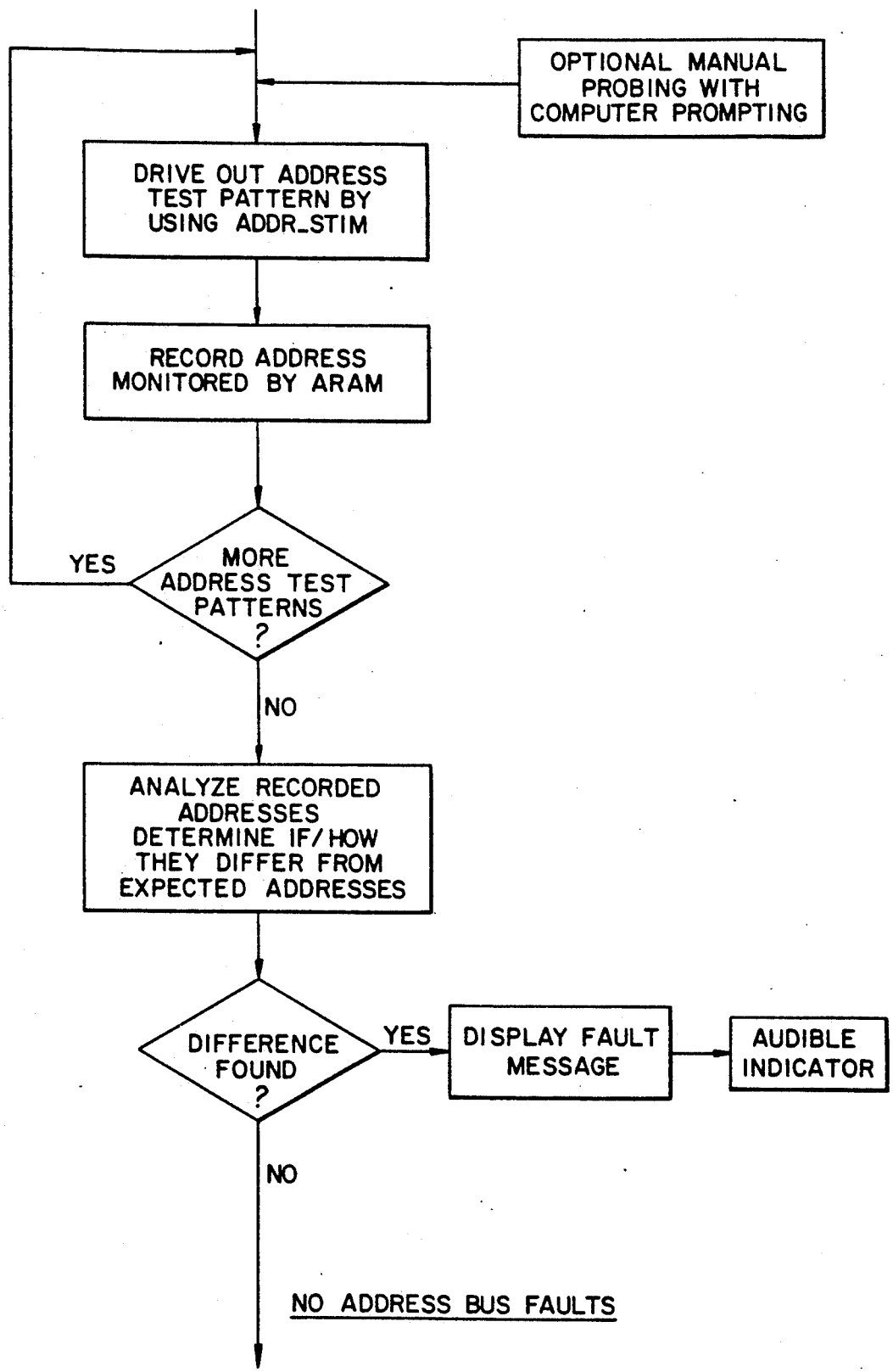
FIG. 10 is a block diagram of the TEST_ADDR test subroutine.

This is a routine that is designed to test and diagnose all faults present on the portion of the address bus used to address the boot ROM. FIG. 10 shows a block diagram of the test routine. As mentioned previously, this test only functions properly if there are no faults on the data bus. The processor is commanded to drive out an address by the stimulus primitive ADDER_STIM, described in detail below. The address patterns used are the same as the data patterns used in the Test_data routine, listed in Table 1. These address patterns are designed to detect all cases of address lines stuck high, low, or tied to another address line. Next, the Analyzer RAM (ARAM) in the pod records the address as seen at the ROM module. This process is repeated until the desired sequence of address patterns has been driven, and recorded.

Then the recorded addresses are analyzed to determine if they differ from the desired values, listed in Table 1. To do this, the analysis algorithm compares, on a bit by bit basis, the stimulus with the response. If a particular line in all of the responses was always found high or low, a fault message is generated to indicate that the line is stuck. If a bit in the results was not always high, or low, but differed from the stimulus, then the line corresponding to that bit is said to be "tied". The result of this is that all faults on this bus will be reported, whether a particular line is tied high, low, or to some other line. If they do differ, a fault message is displayed to the user indicating just what the fault is.

Note that although the procedure shown in FIG. 10 does not involve user probing, that technique could be used as well. As mentioned above, other implementations such as a robot prober could also be used.

Although the patterns shown above in Table 1 are 32 bits wide, as with the TEST_DATA subroutine, the technique described can be applied to a bus of any width. If the address bus connected to the ROM modules are less than 32 bits wide, the same patterns may be used, with the unused upper bits masked off. In a typical application using the 80386 microprocessor, the UUT boot ROM may only require 12 address lines to address it. In that case, the test patterns used would have the upper 20 bits, (32-12), set to be equal to the upper 20 bits of the processor's reset address. Since the reset address for the 80386 is hexadecimal FFFFFFF0, the upper 20 bits of the test patterns would always be hexadecimal FFFFF.

DATABUS_OK

Figure 11:
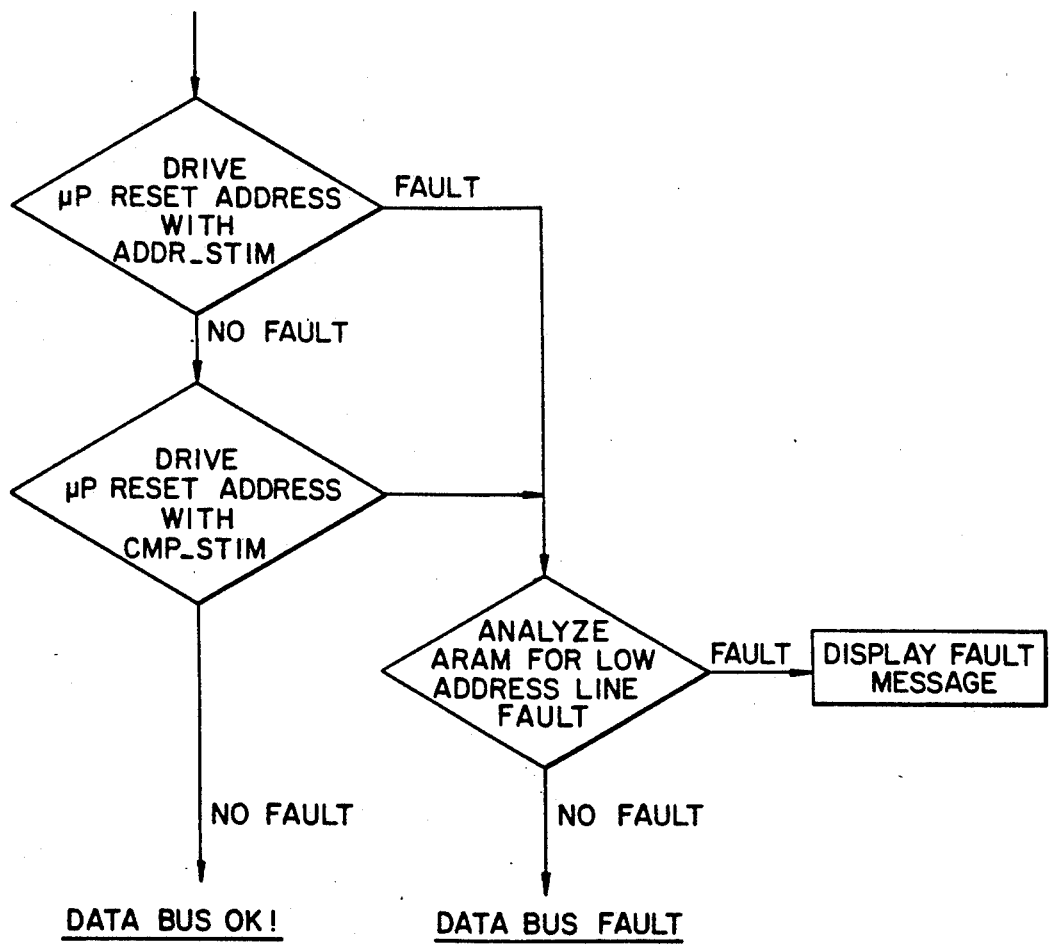
FIG. 11 a block diagram of the DATABUS_OK test subroutine.

This is a routine designed to determine whether or not faults are present on the UUT data bus. It is not intended to determine where, or what kind of faults there might be; but simply whether or not any data bus faults exist. FIG. 11 shows a block diagram of this test routine. First, ADDR_STIM, described below, is used to drive out the reset address of the microprocessor. For the 80386 processor, this is the hexadecimal address FFFFFFF0. The reset address was chosen for this since we already know that the processor itself can drive out the reset address, in spite of whatever other faults may exist on the UUT. We know this fact because it was checked earlier in the kernel diagnosis routine, (test 7 above).

If ADDR_STIM passes, then CMP_STIM, described in detail later, is used to also drive out the reset address from the microprocessor. If both of these routines pass, then we can be assured that the data bus is fault free. See the description of ADDR_STIM and CMP_STIM for more details on how these routines perform in the presence of faults.

There are two reasons why either of these routines would fail. The most likely reason is that there is a data bus fault. Since both of these routines pass the reset address as an immediate operand over the data bus, a data bus fault could cause the microprocessor to receive an incorrect opcode or operand, and thus generate an incorrect address.

The other reason that would cause the routines to fail is a fault on a lower address line. Since both ADDR_STIM and CMP_STIM require that the microprocessor fetch opcodes and data from the boot ROMs, if a lower address line were tied, then the processor would not be able to present the correct address to the ROM, and would fetch incorrect data. So before we can accuse the data bus as causing the fault, we need to analyze the address trace in the ARAM to determine if a lower address line is stuck. (In the 80386 implementation described below for these stimulus primitives, it is required that address lines up through A2 be operational). The analysis is just a matter of noting whether the captured addresses in the ARAM increment smoothly. Consider an example address trace captured in the ARAM for the 80386 microprocessor in a UUT where there are two 8 bit wide boot ROMS. Remember that the ARAM monitors the addresses seen by only one of the ROM modules. Thus, the addresses seen in the ARAM would increment by 2. For this example, the lowest 8 bits of a "good" address trace for ADDR_STIM might look like this, (shown in both hexadecimal and binary):

| | | | |
|---|---|---|---|
| SF0 | 11110000 | ! | The low 8 bits of 80386 reset address |
| SF2 | 11110010 | | |
| SF4 | 11110100 | | |
| SF6 | 11110110 | | |

These addresses are accessed because the microprocessor is fetching the ADDR_STIM program code from the pod's ROM Modules. Now consider what the trace would look like if Address line A2 were tied low:

| | | | |
|---|---|---|---|
| SF0 | 11110000 | ! | The low 8 bits of 80386 reset address |
| SF2 | 11110010 | | |
| SF0 | 11110000 | | |
| SF2 | 11110010 | | |

Here, it can be clearly seen that the addresses did not increment smoothly, and that A2 is stuck low. For this example, a fault message would be generated accusing A2 of being stuck low.

To summarize, then, after either ADDR_STIM or CMP_STIM is seen to fail when driving out the reset address, an analysis of the address trace is undertaken where the low order address lines are checked. If this analysis shows an address line fault, then a fault message is presented to the user. If the analysis shows no fault, then the DATABUS_OK routine is said to have failed; i.e. a fault does exist on the data bus.

Stimulus Primitives

The pod follows the same basic procedure for executing each of the various stimulus primitives. First, the pod loads a test program or test pattern into the Emulation RAM (ERAM). The pod positions the program or pattern at the appropriate address in the ERAM such that it will take control of the UUT microprocessor's behavior immediately following a reset of the UUT. More precisely, the beginning of the test program or pattern is located at the UUT microprocessor's reset address. Next, the pod senses the UUT's supply voltages and its microprocessor clock to verify that the fundamental requirements for microprocessor execution are satisfied. The pod then sets up the Analyzer RAM (ARAM) to gather a trace of the addresses accessed by the UUT, and prepares to generate a sync pulse during a particular UUT bus cycle. After completing this preparation, the pod resets the UUT and waits for it to begin fetching and executing instructions starting at the reset address. As the execution of the UUT microprocessor progresses, the pod's ARAM records a sequential trace of the referenced addresses for subsequent analysis. When UUT execution reaches a selected bus cycle, the pod's logic circuitry generates a sync pulse which can be used in conjunction with the logic probe for measuring UUT logic levels and gathering signatures. After the required number of bus cycles have been captured in the ARAM, the pod analyzes the trace to determine whether the stimulus primitive succeeded or failed. The pod follows this general procedure for all of the stimulus primitives.

The individual primitives are distinguished from one another by several factors. For some primitives, a program is loaded into the ERAM for the UUT microprocessor to execute. The particular program varies, depending on the particular stimulus primitive. For other primitives, a test pattern rather than a program is loaded at the reset address. Finally, the analysis of the ARAM trace by the pod is different for the different stimulus primitives.

There are many ways to implement the stimulus primitives for a given type of UUT microprocessor and for different types of microprocessors. The detailed descriptions of stimulus primitives given here are examples of implementations for the Intel 80386 microprocessor. Excerpts from the programs are presented in 80386 assembly language.

BUSTEST

The BUSTEST primitive functions as a quick go/no-go test of the UUT kernel. It verifies that the UUT address bus and data bus function at least well enough to enable the pod to support its basic read and write operations. BUSTEST does not fully test the UUT kernel, but it does test it sufficiently so that the more sophisticated pod operations can be used to complete the kernel testing.

For the BUSTEST primitive, the pod loads an executable program into the ERAM. The program is designed to exercise that portion of the kernel which must be functional in order to support the more sophisticated pod operations. Specifically, BUSTEST checks that the following kernel components are operable:

(1) That portion of the address bus which is used to address within a small, contiguous block of locations containing the reset address. The size of the block depends on the size of the read/write program used for performing basic pod operations; that in turn depends on the type of microprocessor present in the UUT. The block of locations is typically 2048 or 4096 bytes in size, requiring respectively that the lowest 11 or 12 address bus lines be functional.

(2) That portion of the data bus which connects the boot ROMs to the microprocessor.

(3) The boot ROM chip select logic.

(4) The basic bus cycle timing logic.

The program which is loaded into the ERAM for the BUSTEST primitive can take many forms, provided that it thoroughly exercises the UUT kernel functions listed above. One such form is described below.

The BUSTEST program first exercises the required portion of the address bus. It accomplishes this through a series of load instructions at different addresses. The addresses are chosen so that they will reveal any address bus signals which are stuck at a single logic level, and any sets of two or more address lines which are tied together.

As an example, consider a microprocessor whose reset address is 0, and which requires that the 2048-byte block of locations containing the reset address be functional in order for the pod to be able to perform its standard operations.

The following sequence of addresses, shown in both hexadecimal and binary, might be accessed using load instructions in order to exercise the requisite portion of the address bus:

| Address (hex) | Address (binary) | Purpose |
|---|---|---|
| 07FE | 0000011111111110 | Test A0 low |
| 07FD | 0000011111111101 | Test A1 low |
| 07FB | 0000011111111011 | Test A2 low |
| 07F7 | 0000011111110111 | Test A3 low |
| 07EF | 0000011111101111 | Test A4 low |
| 07DF | 0000011111011111 | Test A5 low |
| 07BF | 0000011110111111 | Test A6 low |
| 077F | 0000011101111111 | Test A7 low |
| 06FF | 0000011011111111 | Test A8 low |
| 05FF | 0000010111111111 | Test A9 low |
| 03FF | 0000001111111111 | Test A10 low |
| 0001 | 0000000000000001 | Test A0 high |
| 0002 | 0000000000000010 | Test A1 high |
| 0004 | 0000000000000100 | Test A2 high |
| 0008 | 0000000000001000 | Test A3 high |
| 0010 | 0000000000010000 | Test A4 high |
| 0020 | 0000000000100000 | Test A5 high |
| 0040 | 0000000001000000 | Test A6 high |
| 0080 | 0000000010000000 | Test A7 high |
| 0100 | 0000000100000000 | Test A8 high |
| 0200 | 0000001000000000 | Test A9 high |
| 0400 | 0000010000000000 | Test A10 high |

As the BUSTEST program executes in the UUT microprocessor, the actual addresses appearing on the address bus are captured in the ARAM. Faults in the exercised address lines cause the captured actual address to differ from the expected address which was commanded by a load instruction.

For example, if address line A0 were stuck at a high logic level, the actual address from the first step in the sequence would be 07FF hexadecimal (0000011111111111 binary), instead of the expected 07FE hexadecimal (0000011111111110 binary). During its analysis of the ARAM trace, the pod detects such deviations and infers that a kernel fault is present.

The next portion of the BUSTEST program exercises the data bus to expose any data line faults that might be present. The principle behind this test is the same as that used for exercising the address bus. Each data line is driven low while all others are high, and vice-versa. This again is accomplished using load instructions, but the test pattern is contained in the data which is loaded rather than in the address which is accessed.

In order to expose faults in the data bus, such faults must be made apparent through changes in behavior on the address bus. The reason for this is that the ARAM captures only the address bus levels from each bus cycle. The data bus is not directly captured by the ARAM. Thus, a data bus fault which was not reflected into the address bus would not be detected. To assure that data bus faults can be detected, the BUSTEST program is written in such a way that data bus faults will cause deviations in behavior which will be observable on the address bus. This is accomplished as follows. First, a test pattern is transferred over the data bus and into a microprocessor register using a load instruction. If a data bus fault corrupts the data being loaded, then a value will be placed in the register which is different from the expected test pattern. Next, the register content is reflected back onto the address bus. In the case of the 30386 microprocessor, this is accomplished by means of an indexed load instruction. The indexed load instruction uses the register containing the previously-loaded data to form an address which is then accessed. This causes the loaded data pattern to influence the address trace directly.

If the data pattern changes (due to a data bus fault) then the address trace will also change. In the subsequent analysis of the trace, the pod will detect the changed address and will infer that a kernel fault is present.

All addresses accessed by the BUSTEST program fall within the boot ROM address range. By avoiding accessing addresses outside of the boot ROM space, the program assures that no invalid or undecoded addresses are accessed. The boot ROM space is guaranteed to be decoded and valid for all UUTs. Additionally, since the boot ROM chip select signal is captured in the ARAM trace, the pod is able to check that this signal is functioning properly in the UUT.

The analysis of the ARAM trace by the pod is the subject of a copending patent application, "Automatic Verification of Kernel Circuitry based on Analysis of Memory Accesses." Here it is sufficient to state that the analysis is able to determine whether a given ARAM trace was produced by a UUT whose kernel is at least minimally functional in the sense described above. If the analysis indicates a good kernel, then the BUSTEST primitive reports success; otherwise, it reports that a kernel fault is present.

A description of the implementation of this stimulus primitive for the 80386 processor follows.

When configured for the 80386 microprocessor, the pod uses a 2 Kbyte region of the UUT address space. The region is located at hexadecimal addresses FFFFF800 through FFFFFFFF, so that it contains the 80386 reset address FFFFFFF0. In order for the pod to perform its basic testing operations, the UUT must be able to successfully address all locations in this region of the address space. In other words, address lines A0 through A10 must be fully functional. In addition, all of the data lines connected to the boot ROM sockets must function correctly. On some UUTs, all 32 data lines are connected to the boot ROMs, so the BUSTEST primitive attempts to test the entire set of data lines.

At the 80386 reset address (FFFFFFF0), the BUSTEST program contains a jump to address FFFFF800, the beginning of the 2 Kbyte region. At FFFFF800 the test proper begins.

Throughout the BUSTEST program (as well as all of the other stimulus primitives), the 80386 is in Real Mode. In Real Mode, the constant FFFF0000 is added to each 16-bit address in the program. This should be taken into consideration when reading the program excerpts which follow.

The first portion of the BUSTEST program drives address lines A0 through A10 successively low, while driving all other address lines high:

| mov | al,cs:byte ptr 0fffeh; | Test A0 low |
| mov | al,cs:byte ptr 0fffdh; | Test A1 low |
| mov | al,cs:byte ptr 0fffbh; | Test A2 low |
| mov | al,cs:byte ptr 0fff7h; | Test A3 low |
| mov | al,cs:byte ptr 0ffefh; | Test A4 low |
| mov | al,cs:byte ptr 0ffdfh; | Test A5 low |
| mov | al,cs:byte ptr 0ffbfh; | Test A6 low |
| mov | al,cs:byte ptr 0ff7fh; | Test A7 low |
| mov | al,cs:byte ptr 0feffh; | Test A8 low |
| mov | al,cs:byte ptr 0fdffh; | Test A9 low |
| mov | al,cs:byte ptr 0fbffh; | Test A10 low |

Next, the program drives address lines A0 through A10 successively high, while driving all other address lines low:

| mov | al,cs:byte ptr 0f801h; | Test A0 high |
| mov | al,cs:byte ptr 0f802h; | Test A1 high |
| mov | al,cs:byte ptr 0f804h; | Test A2 high |
| mov | al,cs:byte ptr 0f808h; | Test A3 high |
| mov | al,cs:byte ptr 0f810h; | Test A4 high |
| mov | al,cs:byte ptr 0f820h; | Test A5 high |
| mov | al,cs:byte ptr 0f840h; | Test A6 high |
| mov | al,cs:byte ptr 0f880h; | Test A7 high |
| mov | al,cs:byte ptr 0f900h; | Test A8 high |
| mov | al,cs:byte ptr 0fa00h; | Test A9 high |
| mov | al,cs:byte ptr 0fc00h; | Test A10 high |

In this example it should be noted that although address lines A0 and A1 do not exist on the 80386 microprocessor itself, they do exist on many 80386-based UUTs. Therefore it is necessary to stimulate and test these low-order address lines.

After exercising the low-order address lines, the BUSTEST program next stimulates data lines D0 through D31. As with the address lines, the data lines are first exercised by driving each successive one low with all the other data lines driven high. The following table of 32-bit test patterns is used for this portion of the test:

| Data Bit Low | Data Stimulus (hex) |
|---|---|
| 00 | fffffffe |
| 01 | fffffffd |
| 02 | fffffffb |
| 03 | fffffff7 |
| 04 | ffffffef |
| 05 | ffffffdf |
| 06 | ffffffbf |
| 07 | ffffff7f |
| 08 | fffffeff |
| 09 | fffffdff |
| 10 | fffffbff |
| 11 | fffff7ff |
| 12 | ffffefff |
| 13 | ffffdfff |
| 14 | ffffbfff |
| 15 | ffff7fff |

-continued

| Data Bit Low | Data Stimulus (hex) |
|---|---|
| 16 | fffeffff |
| 17 | fffdffff |
| 18 | fffbffff |
| 19 | fff7ffff |
| 20 | ffefffff |
| 21 | ffdfffff |
| 22 | ffbfffff |
| 23 | ff7fffff |
| 24 | fefffff |
| 25 | fdffffff |
| 26 | fbffffff |
| 27 | f7ffffff |
| 28 | efffffff |
| 29 | dfffffff |
| 30 | bfffffff |
| 31 | 7fffffff |

The program code for exercising each data line consists of the following steps:

(1) Load the 32-bit test pattern into an index register. This causes the test pattern to traverse the data bus, possibly being altered by any data bus faults that are present.

(2) Shift the index register to position the tested data bit into a position corresponding to an address bit which is captured by the Analyzer RAM.

(3) Perform an indexed load operation, causing the tested data bit to appear on the address bus where it will be captured by the ARAM.

The 80386 code for exercising data lines D0 and D1 is shown below:

```
mov   si,cs:dword ptr d00lo;    Load 32-bit test pattern
shl   si,2;                     Map D0 onto A2
and   si,3fch;                  Clear extraneous bits
mov   si,base_word[si];         Put bits on address bus
mov   si,cs:dword ptr d01lo;    Load 32-bit test pattern
shl   si,2;                     Map D1 onto A3
and   si,3fch;                  Clear extraneous bits
mov   si,base_word[si];         Put bits on address bus
```

The test carries on in this way for the remaining data lines. Then the program tests each data line in the opposite way, driving the selected line high while driving all other data lines low. The patterns used for this portion of the test are the complements of those listed above. The 80386 code for this test is the same as for the previous one, except for the test patterns which are used. Finally, the test concludes by simply looping in place.

DATA_STIM

The DATA_STIM primitive provides the capability of driving arbitrary test patterns onto the UUT data bus. DATA_STIM is not a self-contained test like BUSTEST; rather, DATA_STIM is a tool which supports data bus testing and diagnosis in conjunction with the logic probe. Used in isolation, DATA_STIM does not in general provide a full test of the data bus. It simply forces an arbitrary test pattern onto the data bus, which can then be checked using the logic probe.

The operation of DATA_STIM is based on the principle that all microprocessors, following a reset, perform a fetch from some predetermined address in order to commence their execution. Some types of microprocessors simply begin execution at a fixed address. Other types fetch the starting execution address from a fixed location, called the reset vector. In either case, the first action of the microprocessor following a reset is to perform a fetch from some predetermined location. The address of this first fetch is commonly known as the "reset address."

For the DATA_STIM primitive, the pod does not load an executable program into the ERAM. Instead, it loads a test pattern into the ERAM at the microprocessor's reset address. The test pattern need not be a valid microprocessor instruction; it is simply an arbitrary pattern of binary ones and zeroes. When the pod then resets the UUT, the UUT microprocessor begins by fetching from its reset address in the usual way. This fetch causes the test pattern at the reset address to be driven onto the data bus from the ERAM. The pod generates a sync pulse during this initial bus cycle, so that the actual levels on the data bus signals can be captured via the logic probe. Any differences between these actual levels and the levels specified by the test pattern are indicative of one or more UUT kernel faults.

After the UUT microprocessor has fetched the test pattern from the reset address, it will of course attempt to interpret the pattern as either an instruction or an address at which to begin execution. Since the test pattern is not necessarily a valid instruction or address, this may well cause the microprocessor to halt or otherwise to behave in some unpredictable manner. However, by the time this occurs, the test pattern will have already traversed the data bus, and the needed information will have already been captured by the logic probe. The behavior of the UUT after the initial bus cycle is of no importance.

If a kernel fault causes the initial fetch to occur at an address different from the reset address, then the desired test pattern will not be fetched by the UUT microprocessor. This would normally cause a false indication of a data bus fault. To prevent such a false report, the pod examines the first address captured in the Analyzer RAM, and verifies that it is in fact the reset address. If the first address in the ARAM is incorrect, the pod reports an address bus fault. In other words, if an erroneous test pattern is captured at this point in the test, the fault could be caused by a fetch at an address other than the reset address or a fault on the data bus over which the test pattern is fetched. Testing the address, e.g. the reset address, where the pattern was fetched permits isolation of the fault to on of the two possibilities.

For the 80386 microprocessor, the test pattern used by DATA_STIM is arranged as follows:

| Data Bits | Address |
|---|---|
| D0-D7 | FFFFFFF0 |
| D8-D15 | FFFFFFF1 |
| D16-D23 | FFFFFFF2 |
| D24-D31 | FFFFFFF3 |

ADDR_STIM

Like DATA_STIM, the ADDR_STIM primitive is designed for driving the UUT kernel circuits with an arbitrary test pattern. As its name suggests, ADDR_STIM stimulates the address bus.

To implement ADDR_STIM, the pod loads a small program into the ERAM in such a way that the program will be executed by the UUT microprocessor after the UUT is reset. The program varies in detail depending on the type of microprocessor in the UUT. However, the basic principle of the program is that it exercises the address bus by placing a specified test pattern on the address bus. Often, the ADDR_STIM program consists simply of a load instruction placed at the reset address. The pod fills in the address field of the load instruction with whatever test pattern has been specified by the user. When the pod resets the UUT, the microprocessor executes the load instruction and performs a load at the address whose value is the test pattern. In so doing, the microprocessor places the test pattern onto its address bus.

For microprocessors which fetch the starting execution address from a reset vector (e.g., the Motorola 68000 series), the ADDR_STIM program is even simpler. Here, the test pattern is simply placed at the reset address. When the UUT is reset, it fetches its starting execution address (actually the test pattern) from the reset vector, then begins execution at the specified address. Once again, this causes the microprocessor to place the test pattern on the address bus.

In general, the microprocessor does not drive the test pattern onto the address bus during the very first bus cycle following the reset. The pattern is driven during some subsequent bus cycle which can depend upon both the microprocessor type and the design of the UUT. The pod is calibrated for a given type of UUT so that it can generate a sync pulse during the proper bus cycle. As with DATA_STIM, the user can then capture the actual levels on the address bus using the logic probe, and can compare them with the requested levels to detect and diagnose address bus faults.

The pod uses the Analyzer RAM to check whether an ADDR_STIM operation was successful or not. The pod examines the address which was captured by the ARAM in the bus cycle during which the test pattern should have appeared on the address bus. If the captured address is not equal to the test pattern, the pod infers that a kernel fault is present in the UUT. The fault is not necessarily an address bus fault, however.

It is important to realize that the ADDR_STIM test pattern must first travel from the ERAM to the microprocessor via the data bus before it can be placed on the address bus by the microprocessor. For example, if the ADDR_STIM program consists of a load instruction whose address field contains the test pattern, then the load instruction with its address field must first be fetched via the data bus before it can be executed. If the address field of the instruction is corrupted during its fetch by a data bus fault, then the UUT microprocessor will drive an incorrect test pattern onto the address bus. Likewise, if the opcode of the instruction itself is corrupted, then it is possible that no test pattern or an incorrect pattern will be placed onto the address bus. Thus, in general, the ADDR_STIM primitive should not be used unless the data bus is known to be free of faults. The CMP_STIM primitive described in the next section helps to overcome this weakness.

The 80386 program for the ADDR_STIM primitive is simple. At the reset address is a "load direct" instruction:

mov al,cs:byte ptr 0000h.

The address field of the load instruction is shown as zero. However, this field is filled in by the pod with the requested test pattern. When the 80386 executes the instruction, the test pattern will be placed on the address bus.

Following the load instruction is a jump-to-self loop to terminate the primitive.

CMP_STIM

The CMP_STIM primitive performs the same function as ADDR_STIM, i.e., it drives a specified test pattern onto the UUT address bus. But CMP_STIM uses a slightly different method than ADDR_STIM. By using CMP_STIM together with ADDR_STIM, it is possible to distinguish whether a detected fault is due to a problem on the UUT address bus or on the UUT data bus.

The name CMP_STIM is short for "Complemented Address Stimulus." As with ADDR_STIM, the pod loads a program into the ERAM and executes it by resetting the UUT. But, instead of inserting the actual test pattern into the program, the pod inserts the bitwise complement of the test pattern.

Before driving the complemented pattern onto the UUT address bus, the program complements it once again. The two bitwise complement operations cancel each other out; as a result, the true test pattern is driven onto the address bus.

With a working UUT, therefore, ADDR_STIM and CMP_STIM perform precisely the same function. The user specifies a test pattern, and the stimulus primitive causes it to be driven onto the UUT address bus. In the presence of a UUT address bus fault, the two primitives also behave the same.

Since the same pattern is driven onto the address bus in each case, a given address bus fault will produce the same result.

If the UUT has a data bus fault, however, the ADDR_STIM and CMP_STIM primitives behave differently from one another. Consider an example in which the data line that carries the least-significant bit of the test pattern is stuck at the logic "0" level. For the ADDR_STIM primitive, this stuck "0" level will be directly reflected onto the address bus, making it appear as if the corresponding address line were stuck at a low level. But when the CMP_STIM primitive is used, the low level from the stuck data line will be complemented before it is sent to the address bus, appearing as a stuck high fault on the corresponding address line. The DATABUS_OK routine, described earlier, utilizes this behavior to determine if a kernel fault is due to a data bus fault, or some other type of fault.

Thus, address bus faults are distinguished from data bus faults by driving a single set of test patterns, once using ADDR_STIM and once using CMP_STIM. If the behavior is the same for the two stimulus primitives, then the fault must be on the UUT address bus. If the behavior is opposite, then the fault must be a data bus fault.

The ADDR_STIM and CMP_STIM programs are laid out in memory such that the true or complemented test pattern, respectively, is transferred from the ERAM to the microprocessor using the same set of data bus lines. This ensures that a fault on a given data line will affect the same address line in each case.

As with ADDR_STIM, it is possible for certain data bus faults to corrupt the program opcodes, producing incorrect and sometimes unpredictable behavior. This can usually be detected by a careful analysis of the address trace in the Analyzer RAM.

The 80386 program for CMP_STIM is only slightly more complicated than the program for ADDR_STIM. Located at the reset address, the important part of the program is as follows:

```
nop
mov     si,0000h
not     si
mov     al,cs:byte ptr 0[si].
```

The first instruction is a "no operation" instruction. It is included as padding in order to position the complemented test pattern on the same portion of the data bus as is used for the true test pattern of ADDR_STIM. The second instruction is a "load immediate," which puts the value of its operand into the index register "si." The operand is shown as zero, but in actuality the pod fills in the complemented value of the test pattern. The third instruction complements the contents of the index register, yielding once again the true value of the test pattern. The fourth instruction performs a "load indirect" through the index register, causing the test pattern to appear on the 80386 address bus. As with the other stimulus primitives, CMP_STIM finishes by looping in place.

While the invention has been fully described in detail above to enable those skilled in the art to practice the invention, it will be clear that many variations and modifications of the invention are possible within the purview of ordinary skill in the art in light of the above description. For instance, variations of the stimulus patterns given above are a simple example of a modification which clearly is intended to fall within the scope of the invention. Therefore, it is intended that the above detailed description is given as illustration and not as limitation.

We claim:

1. A method of testing a kernel of a unit under test (UUT) by memory device emulation (MDE), said UUT having a microprocessor, a memory, and data and address buses, comprising the steps of:
   electrically substituting an emulation memory for the memory of said UUT,
   placing an executable program including data and at least a plurality of load instructions into said emulation memory at locations corresponding to a boot memory starting at a reset address;
   commanding a reset of said microprocessor,
   executing said program,
   detecting on said address bus at least one bit pattern appearing in response to at least one of the addresses corresponding to one of said load instructions,
   detecting on said address bus at least one bit pattern appearing in response to at least one of the data corresponding to one of said load instructions,
   analyzing said at least one bit pattern appearing in response to said at least one address and said at least one bit pattern appearing in response to said at least one of the data, and
   verifying operability or determining a fault in said UUT kernel responsive to said analyzing step.

2. The method of claim 1 including the further step of testing power application to said microprocessor.

3. The method of claim 1 including the further step of testing power application to said microprocessor when a fault is determined responsive to said analyzing step.

4. The method of claim 2 including the further step of testing the microprocessor clock.

5. The method of claim 3 including the further step of testing the microprocessor clock when a fault is determined responsive to said analyzing step.

6. The method of claim 4 including the further step of generating a reset overdrive pulse to said microprocessor and determining whether a corresponding signal appears on the microprocessor reset line.

7. The method of claim 5 including the further step of generating a reset overdrive pulse to said microprocessor and determining whether a corresponding signal appears on the microprocessor reset line when a fault is determined by said analyzing step.

8. The method of claim 6 including the further step of sensing the voltage on forcing lines of the microprocessor and reporting a fault if any are at a voltage corresponding to an active state.

9. The method of claim 7 including the further step of sensing the voltage on forcing lines of the microprocessor and reporting a fault if any are at a voltage corresponding to an active state when a fault is determined by said analyzing step.

10. The method of claim 8 including the further step of monitoring the microprocessor control lines and determining if the microprocessor is stopped.

11. The method of claim 9 including the further step of monitoring the microprocessor control lines and determining if the microprocessor is stopped when a fault is determined by said analyzing step.

12. The method of claim 10 including the further step of monitoring the boot memory chip select line to determine if a pulse is received thereon responsive to a reset command to said microprocessor.

13. The method of claim 11 including the further step of monitoring the boot memory chip select line to determine if a pulse is received thereon responsive to a reset command to said microprocessor when a fault is determined by said analyzing step.

14. A method of testing a kernel of a unit under test (UUT) by memory device emulation (MDE), said UUT having a microprocessor, memory and data and address buses comprising the steps of
   a.) electrically substituting an emulation memory for the memory of said UUT,
   b.) placing at least one load instruction into an emulation memory,
   c.) commanding a reset of the UUT microprocessor,
   d.) executing the load instruction to place a predetermined bit pattern on a portion of said address bus,
   e.) detecting a bit pattern on a portion of said address bus,
   f.) repeating steps b.)–e.) for each of a plurality of said bit patterns in said sequence of bit patterns, and
   g.) evaluating the bit pattern on the address bus to detect whether there is an error in the performance of said load instruction.

15. The method according to claim 14 wherein connections are made manually to said portion of said address bus and wherein a prompt is issued to identify said portion prior to each repetition of step f.)

16. The method according to claim 15 including the further step of providing an audible indication of at least one parameter of the result of step g.)

17. A method of testing a kernel of a unit under test (UUT) by memory device emulation (MDE), said UUT having a microprocessor, memory and data and address buses comprising the steps of
   a.) electrically substituting an emulation memory for the memory of said UUT, b.) loading one of a sequence of bit patterns into a location of said emulation memory, c.) commanding a reset of the UUT microprocessor, d.) generating a sync signal responsive to the reset of the microprocessor, e.) detecting a bit pattern on at least a portion of the data bus in accordance with said sync pulse.

f.) repeating steps b.)-e.) for each of a plurality of said bit patterns in said sequence of bit patterns, and g.) analyzing the sequence of bit patterns detected by said detecting step to determine defects in said data bus.

18. The method according to claim 17 wherein connections are made manually to said portion of said data bus and wherein a prompt is issued to identify said portion prior to each repetition of step f.)

19. The method according to claim 18 including the further step of providing an audible indication of at least one parameter of the result of step g.)

20. A method of testing a kernel of a unit under test (UUT) by memory device emulation (MDE), said UUT having a microprocessor, memory and data and address buses comprising the steps of electrically substituting an emulation memory for the memory of said UUT, placing at least one load instruction including a predetermined bit pattern as immediate data into an emulation memory at the reset address, commanding a reset of the UUT microprocessor, executing the load instruction to place said predetermined bit pattern on a portion of said address bus, detecting a resulting bit pattern on said data bus, placing a program including the complement of said predetermined bit pattern as immediate data in said emulation memory at the reset address, executing said program to: place a complement of said predetermined bit pattern on a portion of said data bus, and complement said data in said microprocessor, detecting a further resulting bit pattern on said address bus, and analyzing each of said resulting bit pattern and said further resulting bit pattern and verifying or detecting a fault on said data bus.

21. The method of claim 20, including the further step of comparing said resulting pattern and said further resulting pattern, attributing a fault to a line of said address bus if the comparison is inexact and attributing a fault to said data bus if said comparison is exact.

22. The method of claim 20, including the further step of analyzing the low order bits of each of the addresses accessed by said microprocessor executing said program, attributing a fault to said data bus if no fault is found in the low order lines of said address bus.

23. The method of claim 22 wherein full functionality of said data bus of said UUT is verified if no fault is found by either of said analyzing steps.

24. A method of testing a kernel of a unit under test (UUT) by memory device emulation (MDE), said UUT having a microprocessor, memory and data and address buses comprising the steps of electrically substituting an emulation memory for the memory of said UUT, placing at least one bit pattern into an emulation memory at at least a boot location and at another location within the bootspace memory, commanding reset of said microprocessor a plurality of times, generating a sync pulse in response to said step of commanding reset of said microprocessor, analyzing, in order, the voltage levels on power supply pins, clock pins, forcing pins and status pins of said microprocessor which appear upon successive ones of said commands for reset of said microprocessor to determine microprocessor functionality.

25. A method of testing a kernel of a unit under test (UUT) by memory device emulation (MDE), said UUT having a microprocessor, memory and data and address buses comprising the steps of electrically substituting an emulation memory for the memory of said UUT, placing a predetermined bit pattern as immediate data at a boot location of said emulation memory, commanding reset of said microprocessor, monitoring said address bus for detecting the appearance of all addresses appearing thereon, counting the number of addresses which are monitored between the appearance of the boot location and the appearance of said predetermined bit pattern, and developing a sync signal responsive to subsequent resets in accordance with the result of said counting step.

* * * * *